United States Patent
Kaffenberger

(10) Patent No.: US 6,398,838 B1
(45) Date of Patent: Jun. 4, 2002

(54) FILTER CARTRIDGE ARRANGEMENT

(75) Inventor: Rainer Kaffenberger, Reichelsheim (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/430,984

(22) Filed: Nov. 1, 1999

(30) Foreign Application Priority Data

Nov. 3, 1998 (DE) .......................... 198 50 576

(51) Int. Cl.⁷ ................................. B01D 46/24
(52) U.S. Cl. ...................... 55/498; 55/502; 55/508; 55/DIG. 5
(58) Field of Search .................. 55/498, 497, 495, 55/490, 502, 503, 504, 505, 506, 507, 509, DIG. 5, DIG. 31, 508; 95/273

(56) References Cited

U.S. PATENT DOCUMENTS

| 3,856,489 | A | * | 12/1974 | Vokral | 55/379 |
|---|---|---|---|---|---|
| 4,138,234 | A | * | 2/1979 | Kubesa | 55/498 |
| 4,257,790 | A | * | 3/1981 | Bergquist et al. | 55/502 |
| 4,436,536 | A | * | 3/1984 | Robinson | 55/498 |
| 4,765,811 | A | * | 8/1988 | Beckon | 55/498 |
| 4,838,901 | A | * | 6/1989 | Schmidt et al. | 55/502 |
| 4,865,911 | A | * | 9/1989 | Blizzard | 442/91 |
| 5,149,343 | A | * | 9/1992 | Sowinski | 55/502 |
| 5,308,485 | A | * | 5/1994 | Griffin et al. | 55/479 |
| 5,498,372 | A | * | 3/1996 | Hedges | 252/511 |
| 5,500,029 | A | * | 3/1996 | Zievers et al. | 55/DIG. 5 |
| 5,632,791 | A | * | 5/1997 | Cussoren et al. | 55/498 |
| 5,660,608 | A | * | 8/1997 | Bartholome | 55/498 |
| 5,753,117 | A | * | 5/1998 | Jiang | 55/502 |
| 6,017,379 | A | * | 1/2000 | Kauffman | 55/498 |

FOREIGN PATENT DOCUMENTS

DE 78 08 090 7/1978

* cited by examiner

Primary Examiner—Duane Smith
Assistant Examiner—Jason M. Greene
(74) Attorney, Agent, or Firm—Kenyon & Kenyon

(57) ABSTRACT

A filter cartridge arrangement, including a filter cartridge that is connected on its face with a snap-on ring, forming a seal, where the snap-on ring can be snapped into an opening in a filter housing and where the snap-on ring demonstrates a radial flange on the outside circumference. The radial flange is structured as a circular sealing surface and is supported by a seal on the side of the filter housing that faces the radial flange, forming a seal.

11 Claims, 2 Drawing Sheets

FILTER CARTRIDGE ARRANGEMENT

TECHNICAL FIELD OF THE INVENTION

The invention relates to a filter cartridge arrangement, including a filter cartridge that is connected on its face with a snap-on ring, forming a seal, where the snap-on ring can be snapped into an opening in a filter housing and where the snap-on ring has a radial projection on the outside circumference.

BACKGROUND OF THE INVENTION

Such a filter cartridge arrangement is described in German Patent 78 08 090 U1. In this patent, the snap-on ring is made of a plastic, with a groove on the circumference that is open radially towards the outside. The filter housing is provided with an opening, where the edges of the opening can be snapped into the circumferential groove. The circumferential groove is sealed relative to the edge regions in that a gasket is provided in the base of the circumferential groove. The gasket touches the wall of the filter housing which delimits the opening, along its outside circumference, forming a seal. However, it must be noted in this connection that the previously known filter cartridge arrangement demonstrates satisfactory properties in use only in a narrowly limited temperature range and range of dimensional tolerances of the opening. Because of the arrangement of the seal in the radial direction, between the base of the circumferential groove and the wall of the filter housing which delimits the opening, temperature variations have a particularly disadvantageous effect on the sealing effect in this region, due to differences in heat expansion of the different materials.

Because the prestress of the seal in the radial direction decreases as a function of temperature, the medium to be filtered can easily move from the downstream side to the upstream side of the filter cartridge, past the seal, without being filtered. The same leakage problem occurs if the opening demonstrates production-related variations in tolerance greater than ±1 mm.

SUMMARY OF THE INVENTION

The object of the invention is to further develop a filter cartridge arrangement of the type noted above, which has a more reliable seal between the snap-on ring and the filter housing in every case, independent of the temperatures to which it is subject during the period of use, and independent of the production tolerances.

Specifically, the present invention provides for a filter cartridge assembly for a filter housing. The filter cartridge has a face to which is attached a snap-on ring that can be fitted to the face of the filter cartridge, forming a seal therewith. The snap-on ring has a radial flange circumferentially arrayed about an exterior surface of the ring. The snap-on ring can be snapped into the opening of the filter housing.

To achieve the object, the radial flange is structured as a circular sealing surface and is supported by a seal on the side of the filter housing that faces the radial flange, forming a seal. In this connection, it is advantageous that the seal is arranged, in an axial direction, with axial prestress between the radial flange and the side of the filter housing that faces the radial flange. Independent of the differences in heat expansion and tolerances of the materials of the snap-on ring, the gasket, and the filter housing, an excellent seal between the snap-on ring and the filter housing is assured. In this connection, the temperatures to which the filter cartridge arrangement is subject do not play any role.

Preferably, the snap-on ring and the seal form a unit that can be preassembled. For this purpose, the seal can be adhesively connected with the radial flange.

The seal is preferably structured as a circular sealing disk, where the ratio of the radial width of the sealing disk to its axial thickness is preferably 20 to 2. At such a ratio, heat expansion values in the axial direction are small enough to be ignored, so that the axial prestress with which the seal is arranged between the radial flange and the filter housing constantly remains the same during use for the intended purpose.

In accordance with a first further development, it can be provided that the sealing disk is made of a nonwoven material, which demonstrates a greater flow resistance than the filter material of the filter cartridge. This is necessary in order to prevent a flow short-circuit of the medium to be filtered, past the filter cartridge and through the sealing disk. A sealing disk made of a nonwoven material has the advantage that from the aspect of production technology, it can be easily bonded onto the radial flange of the snap-on ring, for example using ultrasound, if the snap-on ring is made of a polymer material. In general, it is also possible to make the snap-on ring of a metallic material.

According to another further embodiment, the sealing disk can be made of an elastomer material. In such a case, it has proven to be advantageous that the sealing disk made of the elastomer material be glued or vulcanized onto the radial flange, in order to obtain a unit that can be preassembled, made up of the snap-on ring and the seal.

The snap-on ring preferably has at least two circumferentially arranged locking tabs having spring action in the radial direction, which can be snapped into the filter housing radially on the outside. Preferably, the locking tabs are arranged so that they are evenly distributed over the circumference. In this connection, the locking tabs are structured in such a way that the seal between the radial flange and the filter housing is constantly held with sufficient axial prestress. Preferably, the holding claws have an essentially trapezoid cross-section, where the locking tabs have a join angle of 15 to 30° on the side facing away from the radial flange. On the side facing the radial flange, the locking tabs have a hold angle at which they engage behind the edge delimiting the opening of the filter housing, which amounts to 30 to 45°. With such a structure of the locking tabs, for one thing, the snap-on ring can easily be assembled with the filter cartridge, being placed into the opening in the filter housing, and for another, it can easily be centered within the opening. Since the hold angle is greater relative to the axis of the filter cartridge, a secure and permanent connection between the snap-on ring and the filter housing is assured.

The snap-on ring can be provided with a disassembly device. This is particularly advantageous for cleaning or replacing the filter cartridge. The disassembly device can be formed, for example, by recesses within the snap-on ring, in order to allow its removal in the direction opposite the assembly direction.

Preferably, the snap-on ring is made of a polymer material, which may be, for example, electrostatically conductive. In this connection, it is advantageous, for one thing, that it is possible to achieve a good connection between the snap-on ring and the filter cartridge, on their faces, for example by casting it in place, and, for another, that the locking tabs demonstrate sufficiently great elastic resilience in the radial direction. Furthermore, such a filter cartridge arrangement can be inexpensively produced, from an economic point of view.

BRIEF DESCRIPTION OF THE DRAWINGS

An exemplary embodiment of a filter cartridge arrangement constructed according to the invention will be described in greater detail below by reference to the figures, in which.

DETAILED DESCRIPTION OF THE INVENTION

Figure 1:
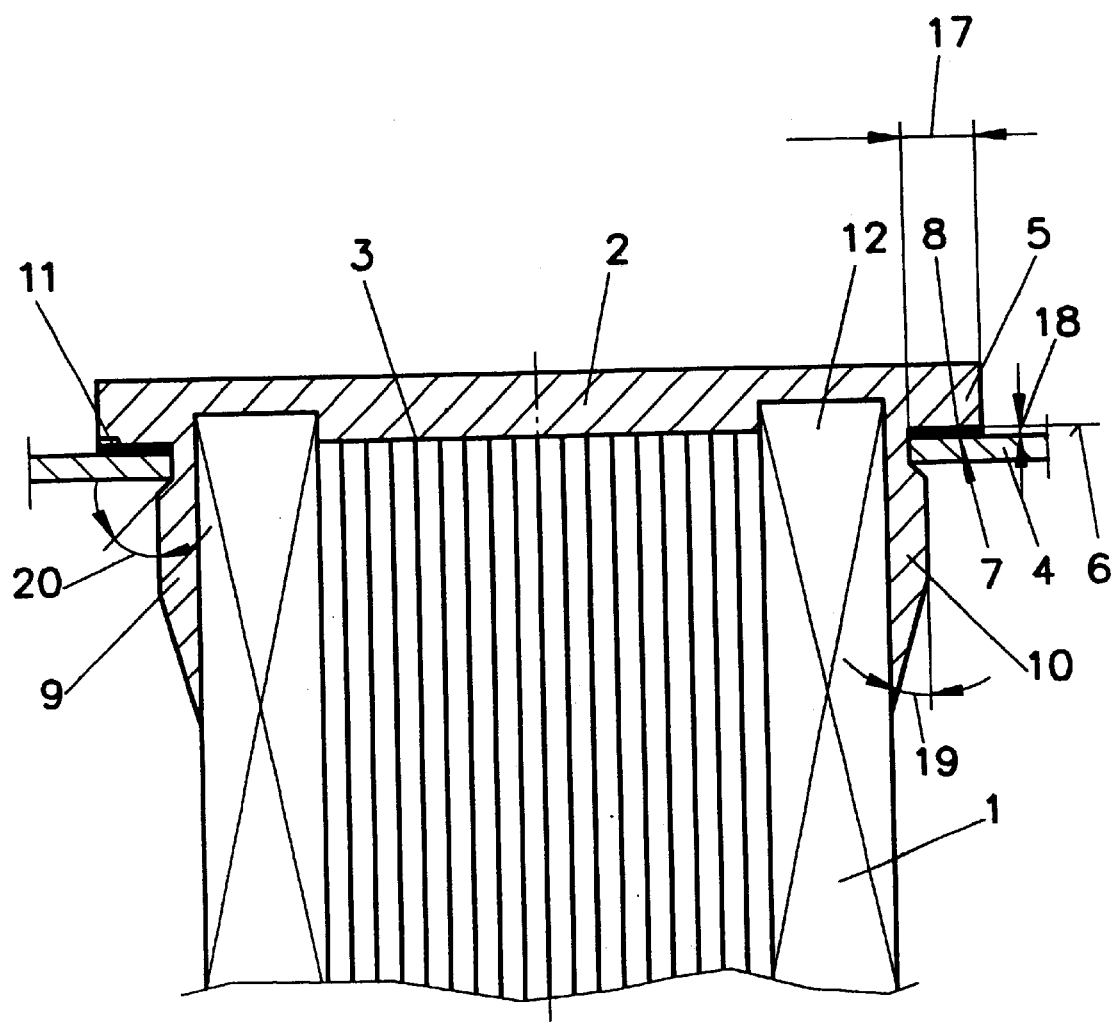
FIG. 1 is a cross sectional view of an exemplary embodiment constructed of a filter cartridge arrangement according to the invention.

FIG. 1 shows an exemplary embodiment of a filter cartridge arrangement. Filter cartridge 1 is made of a nonwoven fiber material and is pleated in the circumferential direction. Filter cartridge 1 and snap-on ring 2 are connected with one another in that face 12 of filter cartridge 1 is bonded into an axially open, circular groove of snap-on ring 2, using cast polyurethane.

In this exemplary embodiment, snap-on ring 2 is made of polyamide, while filter housing 4 is made of a metallic material, for example sheet metal. Opening 3 of filter housing 4 is formed by a bore, with the six locking tabs 9, 10, 13 to 16 which are evenly distributed in the circumferential direction snapping into it, under elastic radial pre-stress.

Radial flange 5 has a circular sealing surface 6, to which sealing disk 8, made of nonwoven material, is bonded using ultrasound. In the exemplary embodiment shown here, the ratio of width 17 to the thickness 18 of the seal 7 is fifteen.

Locking tabs 9, 10, 13 to 16 are all identical in structure with a join angle 19 that is 20° and hold a angle 20 that is 45° in this embodiment.

Disassembly element 11 is formed, in this embodiment, by a groove-shaped recess which runs around the circumference, into which a lever tool can be inserted in order to remove filter cartridge 1 from filter housing 4.

Figure 2:
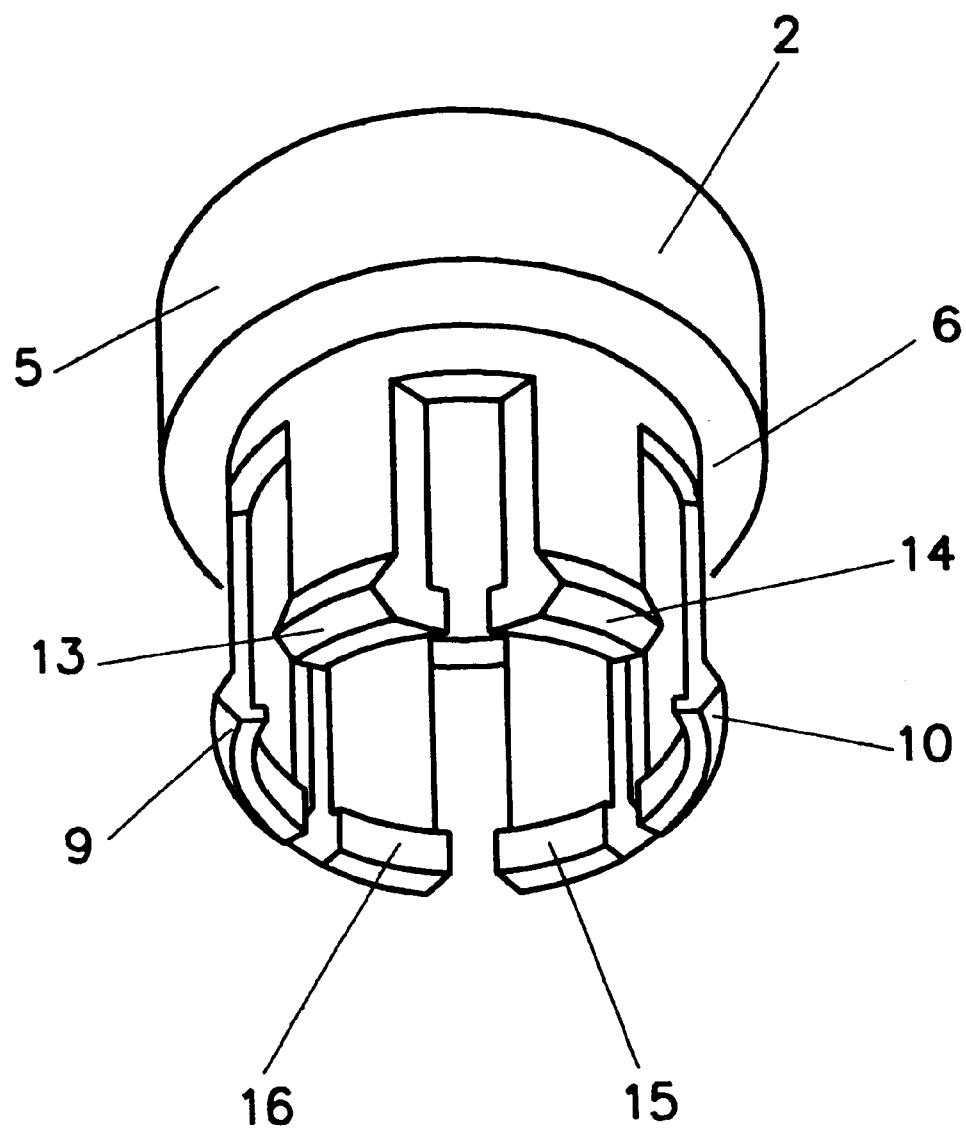
FIG. 2 is a perspective view of the snap-on ring of the filter cartridge arrangement shown in FIG. 1.

FIG. 2 shows the snap-on ring 2 as a separate part. The six locking tabs 9, 10, 13 to 16 are uniformly distributed over the circumference of the ring 2.

Radial flange 5 of snap-on ring 2, with its sealing surface 6, is arranged on the side facing away from locking tabs 9, 10, 13 to 16.

What is claimed is:

1. A filter cartridge assembly for a filter housing that presents an opening for receipt of the filter cartridge assembly, comprising:

a filter cartridge having a face;

a snap-on ring that can be fitted to the face of the filter cartridge forming a seal therewith, the snap-on ring having a radial flange circumferentially arrayed about an exterior surface of the ring, the radial flange including a substantially planar circumferentially extending sealing surface, wherein the snap-on ring can be snapped into an opening in a filter housing; and a sealing disk abutting the radial flange, facing the opening of the filter housing, so that it forms a seal therewith, wherein the ration of the radial width of the sealing disk to its axial thickness is between about 2 and about 20.

2. The filter cartridge arrangement according to claim 1, wherein the snap-on ring and the sealing disk form a unit that can be preassembled.

3. The filter cartridge arrangement according to claim 1, wherein the sealing disk is made of a nonwoven material that has greater flow resistance than the filter material of the filter cartridge.

4. The filter cartridge arrangement according to claim 1, wherein the sealing disk is made of an elastomer material.

5. The filter cartridge arrangement according to claim 1, wherein the snap-on ring has at least two circumferentially arranged locking tabs of esentially trapezoidal cross section that are radically resillient, adapted to be snapped into the filter housing so that the filter housing is radially outside the ring.

6. The filter cartridge arrangement according to claim 3, wherein the snap-on ring has at least two circumferentially arranged locking tabs that are radially resilient, which can be snapped into the filter housing so that the filter housing is radially outside the ring.

7. The filter cartridge arrangement according to claim 4, wherein the locking tabs are evenly distributed over the circumference of the ring.

8. The filter cartridge arrangement according to claim 1, wherein the snap-on ring has a disassembly element that is a recess.

9. The filter cartridge arrangement according to claim 5, wherein the snap-on ring has a disassembly element that is a recess.

10. The filter cartridge arrangement according to claim 1, wherein the snap-on ring is made of a polymer material.

11. The filter cartridge arrangement according to claim 10, wherein the polymer material is electrostatically conductive.

* * * * *